United States Patent
Ueda et al.

(10) Patent No.: US 7,441,276 B2
(45) Date of Patent: Oct. 21, 2008

(54) CONTENT PROCESSING LIMIT METHOD, CONTENT PROCESSING LIMIT PROGRAM, AND CONTENT EDITION DEVICE

(75) Inventors: Hirotaka Ueda, Chiba (JP); Kentaro Sakakura, Yamatokoriyama (JP); Soichi Nitta, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 648 days.

(21) Appl. No.: 10/514,170

(22) PCT Filed: Apr. 28, 2003

(86) PCT No.: PCT/JP03/05483

§ 371 (c)(1),
(2), (4) Date: Nov. 12, 2004

(87) PCT Pub. No.: WO03/098445

PCT Pub. Date: Nov. 27, 2003

(65) Prior Publication Data

US 2005/0251694 A1 Nov. 10, 2005

(30) Foreign Application Priority Data

May 15, 2002 (JP) ............................. 2002-140210

(51) Int. Cl.
*H04L 9/32* (2006.01)
(52) U.S. Cl. .......................................... 726/26; 726/27
(58) Field of Classification Search ............. 726/26–27, 726/30–31; 713/176; 705/51, 57–59; 382/100
See application file for complete search history.

(56) References Cited

U.S. PATENT DOCUMENTS

| 5,355,336 A | * | 10/1994 | Yoshioka | ..................... 365/154 |
| 6,850,619 B1 | * | 2/2005 | Hirai | ......................... 380/203 |

FOREIGN PATENT DOCUMENTS

| JP | 10-79016 A | 3/1998 |
| JP | 2000-112823 A | 4/2000 |
| JP | 2000-293439 A | 10/2000 |
| JP | 2001-197423 A | 7/2001 |
| JP | 2001-256413 A | 9/2001 |
| JP | 2001-290780 A | 10/2001 |
| JP | 2001-350664 A | 12/2001 |
| JP | 2002-49840 A | 2/2002 |

\* cited by examiner

*Primary Examiner*—Hosuk Song
(74) *Attorney, Agent, or Firm*—Birch, Stewart, Kolasch & Birch, LLP (57) ABSTRACT

In an insertion operation for combined use of contents in a content editing device such as a portable phone, if content without being combined is authorized content, all restriction conditions that have been added to content to be inserted and existing content are initially extracted. The restriction condition refers to information restricting combination with other content or information restricting combination with specific content. The content editing device investigates whether or not the restriction condition described above is satisfied with respect to all contents, and allows insertion of the content in the existing content only when the restriction condition is satisfied.

7 Claims, 9 Drawing Sheets

CONTENT X

[DATA]
ID="SH-2002-EANIME-000023"        //ID OF CONTENT
TYPE="animation"                   //TYPE OF CONTENT
CATEGORY="animal"                  //CATEGORY OF CONTENT
KEYWORD="lion, nature"             //KEYWORD OF CONTENT

[SINGLE]                           //RESTRICTION ON USE OF CONTENT WITHOUT BEING COMBINED
ALLOW PRINT                        //PRINTING ALLOWED
ALLOW SEND                         //SENDING ALLOWED
ALLOW TRANSLATE                    //TRANSLATION ALLOWED
DISABLE TRANSFORM                  //TRANSFORMATION NOT ALLOWED
ALLOW ZOOM                         //ZOOM UP ALLOWED

[COMBINATION]                      //RESTRICTION ON USE IN COMBINATION
ALLOW USE TYPE="image, animation, sound"        //COMBINATION WITH IMAGE, ANIMATION, SOUND IS ALLOWED
ALLOW USE ID="SH-*-EANIME-*"AND TYPE="animation"  //RESTRICTION ON ID AND TYPE ALLOWING COMBINATION
DISABLE USE CATEGORY="sex, violence"            //DESIGNATION OF CATEGORY, COMBINATION WITH WHICH NOT ALLOWED

CONTENT PROCESSING LIMIT METHOD, CONTENT PROCESSING LIMIT PROGRAM, AND CONTENT EDITION DEVICE

TECHNICAL FIELD

The present invention relates to a method and a program for restricting a content processing and a device for editing content, and more particularly to a method and a program for restricting a content processing capable of appropriate management of the content and a device for editing the content.

BACKGROUND ART

As a network is developed, a user can freely obtain contents such as image data or a photograph. That is, an environment in which the user can freely use the content with a processor terminal such as a personal computer is now available.

If a provider of such contents allows free use thereof without particularly claiming his/her copyright, the user can freely edit or modify the content and combine the content with another.

On the other hand, if the provider of the content adds an original concept or other value or right to the content, the provider may wish to restrict use or combined use thereof.

In such a case, though restriction on a prescribed processing such as restriction on printing has been imposed according to a conventional technique, combination with other content or a further sophisticated processing has been difficult to restrict and appropriate management of the copyright has been difficult.

The present invention was made to solve the above-described problems, and an object of the present invention is to provide a method and a program for restricting a content processing capable of appropriate management of the content, a recording medium recording the program, and a device for editing the content.

DISCLOSURE OF THE INVENTION

In the present invention, in order to solve the above-described problems, a method of restricting a content processing as set forth below is provided.

(1) A method of restricting a content processing when first content is combined with second content, including the steps of: recognizing first restriction information added to the first content; recognizing second restriction information added to the second content; and restricting a processing of the second content based on recognized first and second restriction information.

(2) The method of restricting a content processing according to (1), in which when at least one of the first restriction information and the second restriction information includes exclusive information restricting simultaneous, combined use with other content, in the step of restricting, a processing to combine the second content with the first content is restricted.

(3) The method of restricting a content processing according to (1), in which when the second restriction information includes information restricting at least one of a processing for modification of scale size with respect to the second content, a rotation processing, a reversal processing, an entire-image display processing, a color change processing, a time limit of use, a processing for modification of a relative position, and a reproduction control processing in simultaneous, combined use with other content, in the step of restricting, a processing in combining the second content is restricted based on the second restriction information.

(4) The method of restricting a content processing according to (1), in which when at least one of the first restriction information and the second restriction information includes a prescribed condition in simultaneous, combined use with other content, in the step of restricting, all included prescribed conditions are extracted from the first restriction information and the second restriction information, and unless the first content and the second content satisfy all the extracted conditions, a processing to combine the second content with the first content is restricted.

(5) The method of restricting a content processing according to (1), in which at least one of the first content and the second content includes a plurality of contents.

(6) The method of restricting a content processing according to (4), in which at least one of the first restriction information and the second restriction information further includes information indicating an attribute of the content, and the prescribed condition is a condition on the attribute of content to be combined.

In addition, in order to solve the above-described problems, a program product for restricting a content processing as set forth below is further provided.

(7) A program product for restricting a content processing causing a computer to restrict a content processing when first content is combined with second content, causing a computer to execute the steps of: recognizing first restriction information added to the first content; recognizing second restriction information added to the second content; and restricting a processing of the second content based on recognized first and second restriction information.

(8) The program product for restricting a content processing according to (7), in which when at least one of the first restriction information and the second restriction information includes exclusive information restricting simultaneous, combined use with other content, in the step of restricting, a processing to combine the second content with the first content is restricted.

(9) The program product for restricting a content processing according to (7), in which when the second restriction information includes information restricting at least one of a processing for modification of scale size with respect to the second content, a rotation processing, a reversal processing, an entire-image display processing, a color change processing, a time limit of use, a processing for modification of a relative position, and a reproduction control processing in simultaneous, combined use with other content, in the step of restricting, a processing in combining the second content is restricted based on the second restriction information.

(10) The program product for restricting a content processing according to (7), in which when at least one of the first restriction information and the second restriction information includes a prescribed condition in simultaneous, combined use with other content, in the step of restricting, all the included prescribed conditions are extracted from the first restriction information and the second restriction information, and unless the first content and the second content satisfy all the extracted conditions, a processing to combine the second content with the first content is restricted.

(11) The program product for restricting a content processing according to (7), in which at least one of the first content and the second content includes a plurality of contents.

(12) The program product for restricting a content processing according to (10), in which at least one of the first restriction information and the second restriction information further includes information indicating an attribute of the content, and the prescribed condition is a condition on the attribute of content to be combined.

In addition, in order to solve the above-described problems, a content editing device as set forth below is further provided.

(13) A content editing device performing content edition to combine first content and second content, including: means for recognizing first restriction information added to the first content; means for recognizing second restriction information added to the second content; and means for restricting a processing of the second content based on recognized first and second restriction information.

(14) The content editing device according to (13), in which when at least one of the first restriction information and the second restriction information includes exclusive information restricting simultaneous, combined use with other content, the means for restricting restricts a processing to combine the second content with the first content.

(15) The content editing device according to (13), in which when the second restriction information includes information restricting at least one of a processing for modification of scale size with respect to the second content, a rotation processing, a reversal processing, an entire-image display processing, a color change processing, a time limit of use, a processing for modification of a relative position, and a reproduction control processing in simultaneous, combined use with other content, the means for restricting restricts a processing in combining the second content based on the second restriction information.

(16) The content editing device according to (13), in which when at least one of the first restriction information and the second restriction information includes a prescribed condition in simultaneous, combined use with other content, the means for restricting extracts all the included prescribed conditions from the first restriction information and the second restriction information, and unless the first content and the second content satisfy all the extracted conditions, the means for restricting restricts a processing to combine the second content with the first content.

(17) The content editing device according to (13), in which at least one of the first content and the second content includes a plurality of contents.

(18) The content editing device according to (16), in which at least one of the first restriction information and the second restriction information further includes information indicating an attribute of the content, and the prescribed condition is a condition on the attribute of content to be combined.

BEST MODES FOR CARRYING OUT THE INVENTION

In the following, embodiments of the present invention will be described with reference to the figures. It is noted that the same reference characters refer to the same or corresponding components in the figures, of which denotation and functions are also the same. Therefore, detailed description thereof will not be repeated.

First Embodiment

Figure 1:
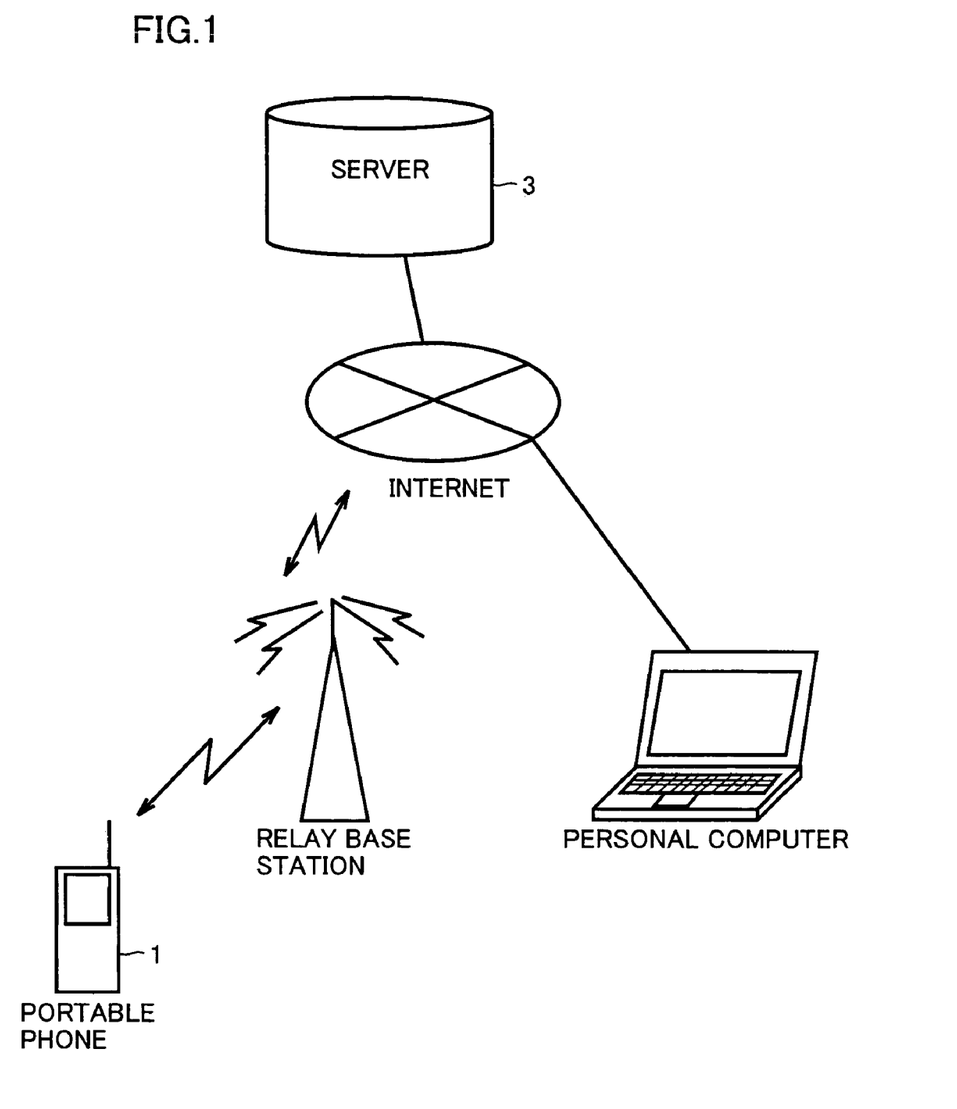
FIG. 1 illustrates a common network system.

In the present embodiment, various contents are combined in a common network system shown in FIG. 1.

In the present embodiment, combination of the contents above in portable phone 1 serving as a communication terminal will be described. Naturally, the communication terminal is not limited to the portable phone, and other communication terminals such as a personal computer or a PDA (Personal Digital Assistants) may be employed.

In the present embodiment, a user uses portable phone 1 to combine content obtained from a server 3 through the Internet with content created in portable phone 1.

Figure 2:
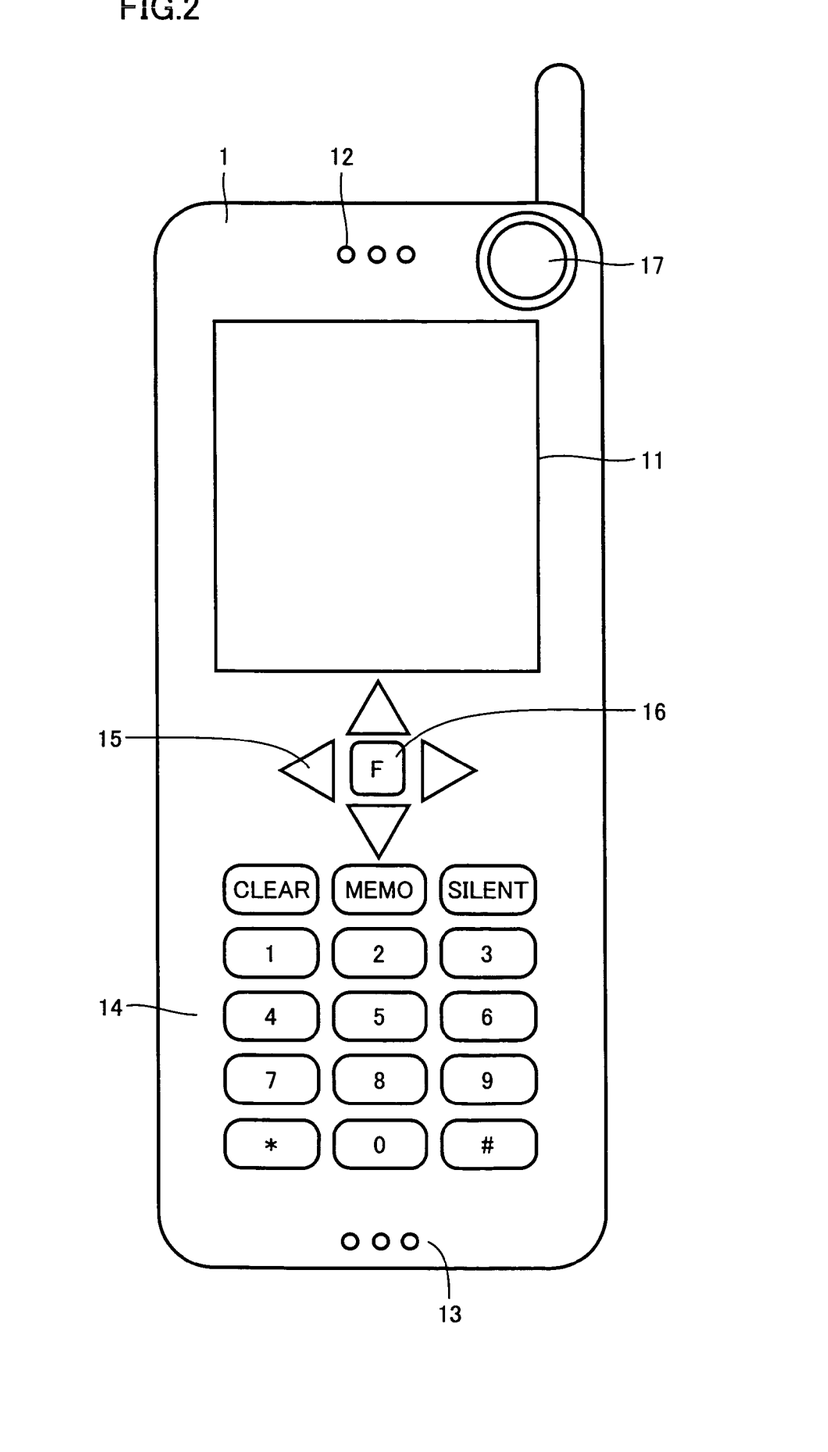
FIG. 2 illustrates a portable phone 1.

Referring to FIG. 2, portable phone 1 includes a display screen 11 implemented by an LCD (Liquid Crystal Display) or the like for displaying information, a speaker 12, a microphone 13, a numeric keypad 14 for input of a telephone number or the like, a cursor key 15 for moving a cursor, a function key 16 for selecting a function or the like, and a camera 17.

The overall configuration of portable phone 1 shown in FIG. 2 represents a configuration of a common portable phone, although without limited thereto. For example, camera 17 may not be provided, and a scheme to allow obtaining a variety of information through connection with other equipment may be provided.

Figure 3:
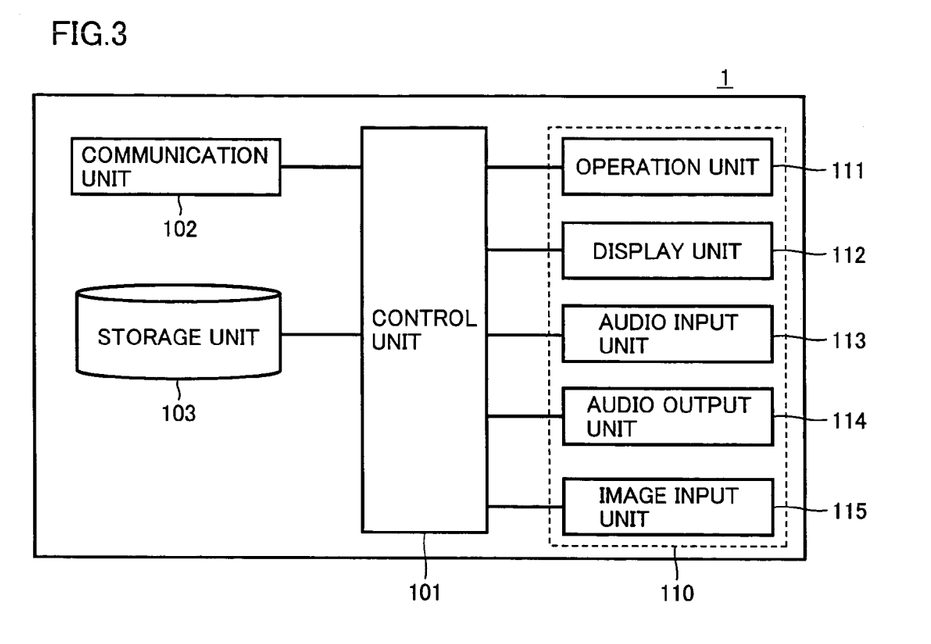
FIG. 3 is a functional block diagram of portable phone 1.

Referring to FIG. 3, a functional block of portable phone 1 shown in FIG. 2 will be described.

As shown in FIG. 3, portable phone 1 includes a control unit 101 constituted of a CPU (Central Processing Unit) and the like and responsible for overall control, a communication unit 102 responsible for communication through a relay base station, a storage unit 103 storing a program executed in control unit 101, intermediate data of the program, and data obtained from another device, and an input/output unit 110 accepting input/output of various information and instructions.

Input/output unit 110 includes an operation unit 111 for input of a telephone number of another phone, input of an item for retrieving a received e-mail, and input of a request to display the received e-mail by the user of portable phone 1, a display unit 112 implemented by display screen 11 showing information to the user, an audio input unit 113 implemented by microphone 13 receiving voice and sound, an audio output unit 114 implemented by speaker 12 outputting voice and sound, and an image input unit 115 implemented by camera 17 picking up an image.

It is noted that portable phone 1 shown in FIG. 3 includes common hardware, although without limited thereto.

Here, an example in which animation is created using an application stored in storage unit 103 in such portable phone 1 will be discussed.

Figure 4:
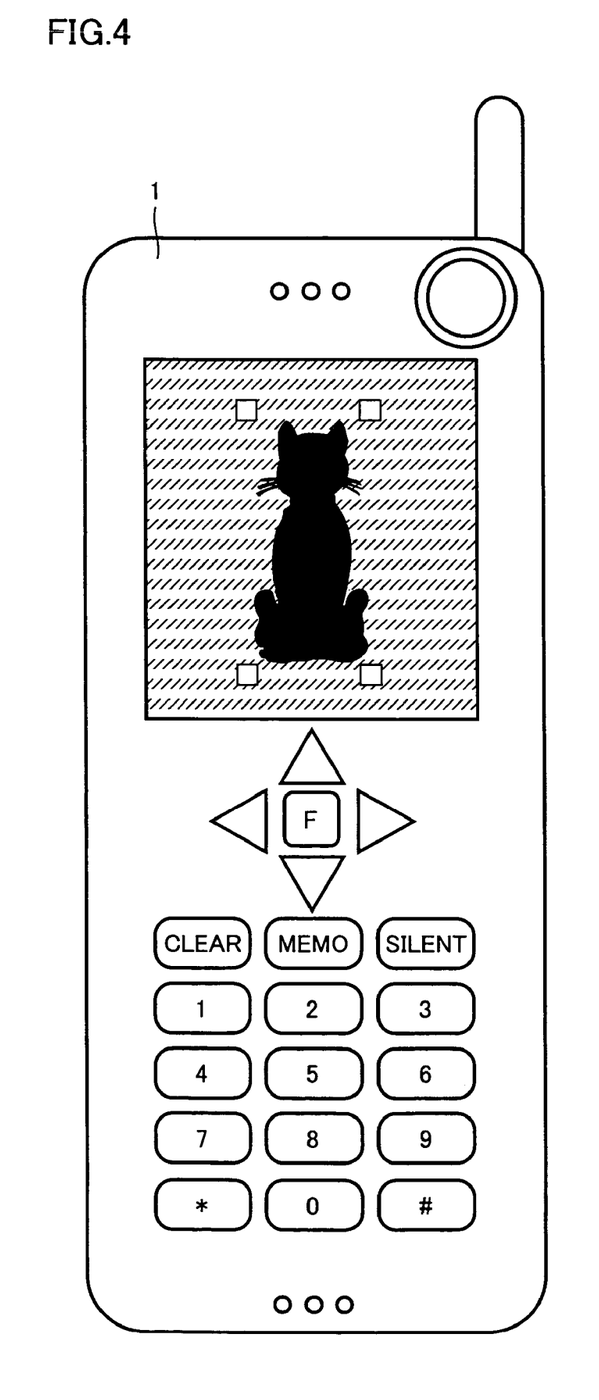
FIG. 4 illustrates a specific example of an animation creation tool operating on portable phone 1.
Figure 5A:
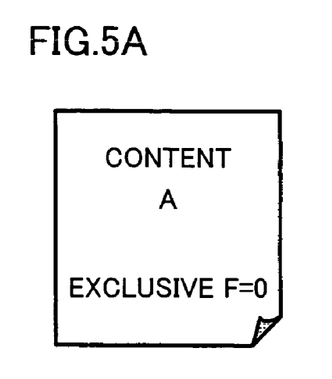
FIGS. 5A to 5D illustrate specific examples of contents provided with exclusive information as restriction information.
Figure 5B:
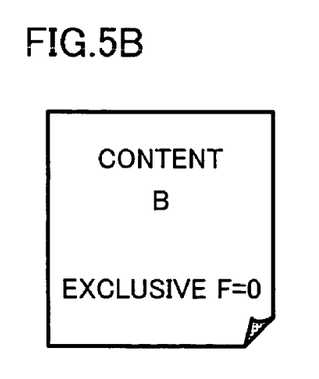
Figure 5C:
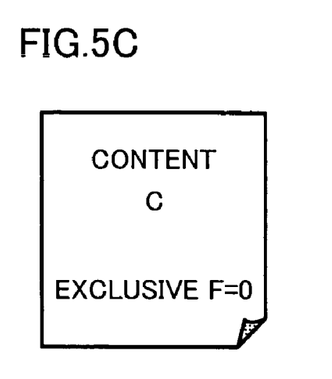
Figure 5D:
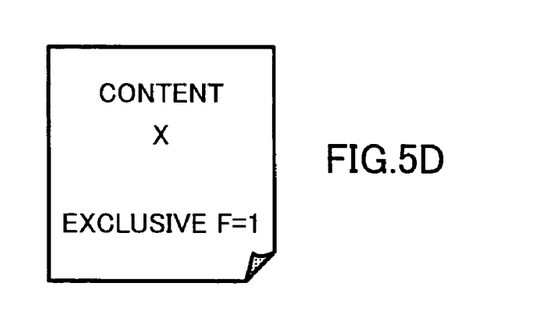

An application shown in FIG. 4 serves to create one animation content by arbitrarily combining contents such as a clip art (image data) for a background image or animation, arbitrary text information, and BGM sound information on portable phone 1. When the animation content is created using this application, the user performs an operation to select and add the content such as an image that he/she desires to insert.

The content to be inserted has been obtained by downloading through the Internet, reception via an e-mail, transfer from a connected external memory, or image pick-up using camera 17, and the content is in turn stored in storage unit 103.

In addition, if the content to be inserted is the clip art, the user can perform an operation such as movement of an insertion position, zoom up and down, and erasing, using cursor key 15 or numeric keypad 14.

The content in the first embodiment is characterized in that restriction information has been added thereto.

FIGS. 5A to 5D illustrate specific examples of the content provided with exclusive information as the restriction information. FIGS. 5A to 5D illustrate specific examples of content A, content B, content C, and content X, respectively.

Referring to FIGS. 5A to 5D, each of contents A, B, C, and X is provided with an exclusive flag as the exclusive information. Contents A to C of which exclusive flag indicates 0 can be combined with other content, while content X of which exclusive flag indicates 1 is exclusive content that cannot be combined with other content.

Referring to FIGS. 5A to 5D, possible combinations of contents A, B, C, and X are limited to those in the following:
 content A and content B;
 content B and content C;
 content C and content A; and
 content A and content B and content C.

In addition, each content can be used alone.

The restriction information added to each content shown in FIGS. 5A to 5D is created by the provider of the content such as a creator of the content or those who have the right with regard to the content (such as a management company or a provider). The restriction information is added to the content itself, for example, in a header of the content.

In portable phone 1 in the first embodiment, when the animation content is created by inserting the content described above, whether or not the combination of the content is allowed is automatically controlled.

Figure 6:
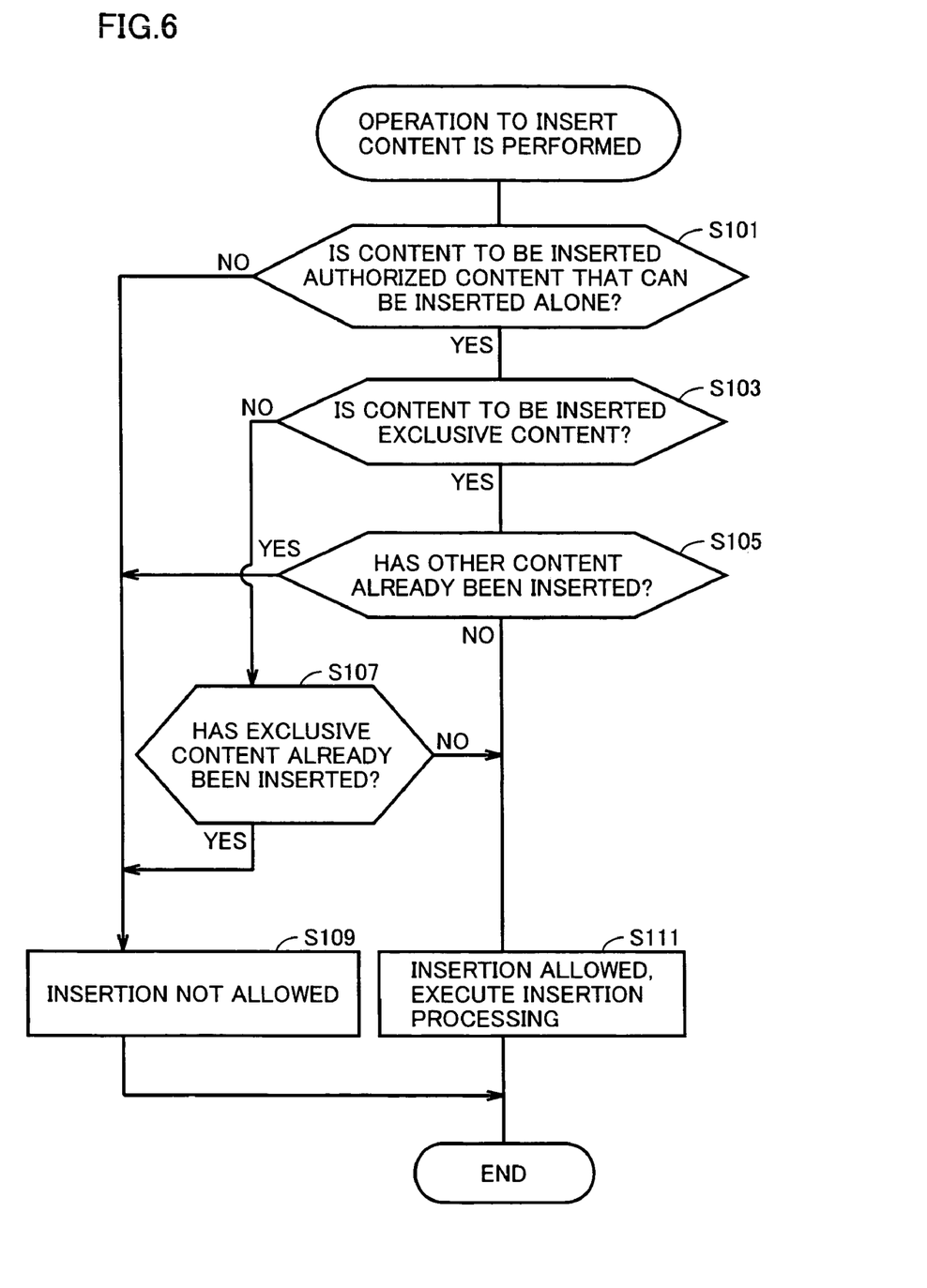
FIG. 6 is a flowchart showing a flow of control in insertion of the content in a first embodiment.

FIG. 6 is a flowchart showing a flow of control in insertion of the content in the first embodiment. A processing shown in the flowchart in FIG. 6 is performed by reading and execution of a program stored in storage unit 103 by control unit 101 in portable phone 1.

Referring to FIG. 6, initially, when the user selects the content to be inserted, for example, through selection from a library in order to create the animation content using portable phone 1, whether or not the content to be inserted is in a file format allowing insertion is checked (S101). In addition, by checking information on copyright added to the content, whether or not the content (without being combined with other content) can be inserted alone is determined.

If the content is not in the file format allowing insertion, or if information not allowing insertion with regard to the copyright has been added, or if the content is unauthorized (a manner of creating or obtaining the content is unauthorized) (No in S101), an operation for insertion is aborted (S109) and the program ends. Here, a message such as "the content is corrupted" or "insertion not allowed" may be displayed on display screen 11.

If insertion of the selected content is allowed (Yes in S101), successively, whether or not the selected content is exclusive content is checked (S103). In other words, whether the exclusive flag serving as the restriction information that has been added indicates 0 or 1 is checked.

If the selected content is not the exclusive content (No in S103), whether or not exclusive content is present in the content that has already been inserted is checked (S107). That is, each exclusive flag of the content that has already been inserted is checked.

If the exclusive content has already been inserted (Yes in S107), the operation for insertion is aborted (S109), for example, by showing a message such as "the content prohibiting combination has already been inserted" on display screen 11, and the program ends.

If the exclusive content has not been inserted (No in S107), the operation for inserting the content is performed (S111) and the program ends.

If the selected content is the exclusive content (Yes in S103), whether or not other content has already been inserted is checked (S105).

If other content has already been inserted (Yes in S105), the selected content cannot be inserted. Therefore, the operation for insertion is aborted (S109), for example, by showing a message such as "combination with other content is not allowed" on display screen 11, and the program ends.

If other content has not been inserted (No in S105), the operation for inserting the content is performed (S111) and the program ends.

In the processing described above, the processing can proceed by checking by control unit 101 of portable phone 1, of the restriction information of the content added to the header or the like of the content.

In the embodiment described above, the example in which each content is provided with the exclusive information indicating whether or not combination with other content is allowed has been described. The exclusive information, however, is not limited to the exclusive flag, and a table indicating with which content combination is allowed may be employed.

In this manner, if the provider of the content adds the exclusive information to the content as the restriction information, not only management of the content alone but also management of the copyright or the like in using a plurality of contents can appropriately be performed.

Execution of the processing described above by portable phone 1 in the present embodiment allows automatic and appropriate management of the copyright or the like of the content.

Second Embodiment

In the first embodiment described above, restriction as to whether or not combination of contents is allowed has simply been discussed. Here, restriction on a function of combination will be discussed.

The content in the second embodiment is characterized in that each content has an ID serving as identification information set and has combination restriction information added as the restriction information.

FIGS. 7A to 7D illustrate specific examples of the content provided with combination restriction information as the restriction information and having an ID set.

Figure 7A:
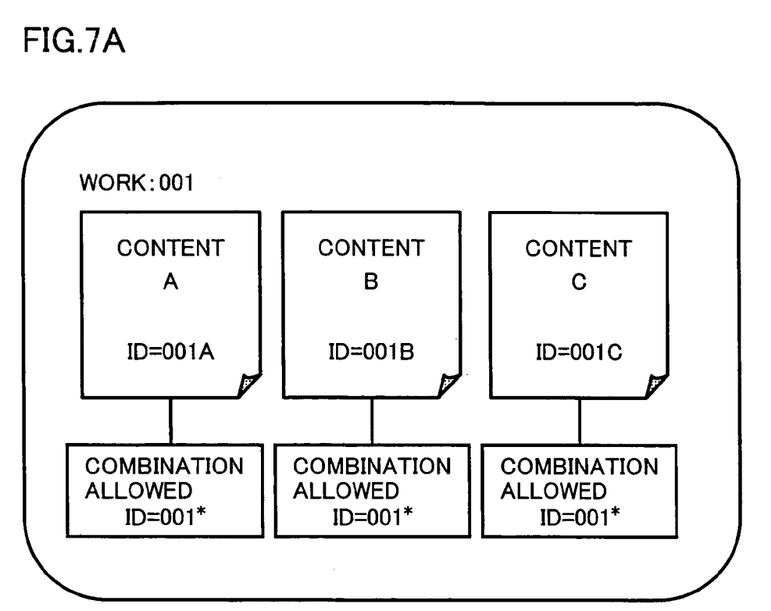
FIGS. 7A to 7D illustrate specific examples of contents provided with combination restriction information as the restriction information and having an ID set.

FIG. 7A illustrates specific examples of contents A, B and C. Contents A, B and C are associated with a work 001 provided by a certain content provider, which is indicated by the fact that respective IDs set for contents A, B and C begin with 001. Characters A, B and C following 001 in the ID set for contents A, B and C represent information specific to respective contents A, B and C, that is, information indicating information of a creator, information indicating a time of creation, and specific information indicating other information. More specifically, versatility can be enhanced by setting hierarchical IDs such as a copyright holder ID+a work ID+an individual ID, or the like.

In addition, the combination restriction information added to each of contents A, B and C shown in FIG. 7A all presents "ID=001*", which means that each of contents A, B and C can be combined with other content having an ID beginning with 001 set.

Figure 7B:
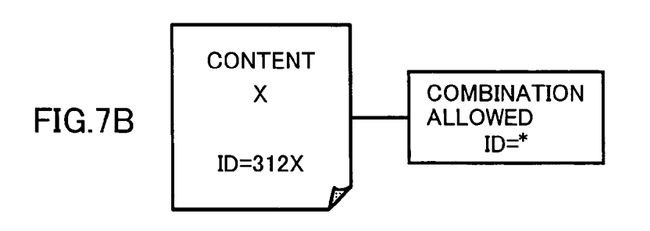
Figure 7C:
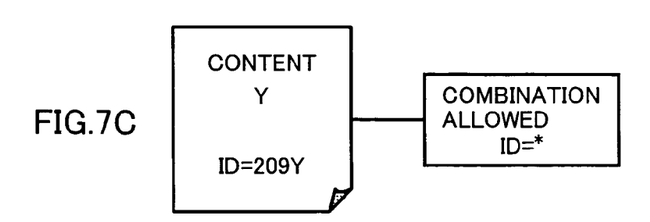
Figure 7D:
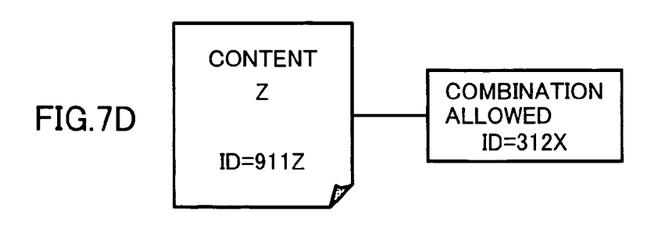

Meanwhile, contents X, Y and Z shown in FIGS. 7B and 7C are provided with an ID indicating that these contents are associated with a work other than work 001 above.

The combination restriction information "ID=*" added to contents X and Y indicates that restriction is not specifically imposed when one content is combined with other content. In this manner, versatility can be enhanced also by setting a wild card such as an asterisk for the ID of the content to be combined that serves as the combination restriction information and restricts combination. In other words, by setting a wild card such as an asterisk as described above for the ID of the content to be combined that serves as the combination restriction information and restricts combination, designation that combination with all contents is allowed can be made.

Referring to FIGS. 7A to 7D, possible combinations of contents A, B, C, X, Y, and Z are limited to those in the following:

content A and content B;
content B and content C;
content C and content A;
content X and content Y;
content X and content Z; and
content A and content B and content C.

In addition, each content can be used alone.

As in the content in the first embodiment, the combination restriction information added to each content shown in FIGS. 7A to 7D is created by the provider of the content. In addition, the ID set for each content is also set by the provider of the content.

The ID or a combination restriction condition described above is not limited to the specific example described above. That is, the ID is not limited to those associated with the work in the content, and the ID may be set for other parameters (such as a creator or a production company). This is also the case for the combination restriction condition.

In portable phone 1 in the second embodiment as well, restriction on combination is automatically controlled when the animation content is created by inserting the content described above.

Figure 8:
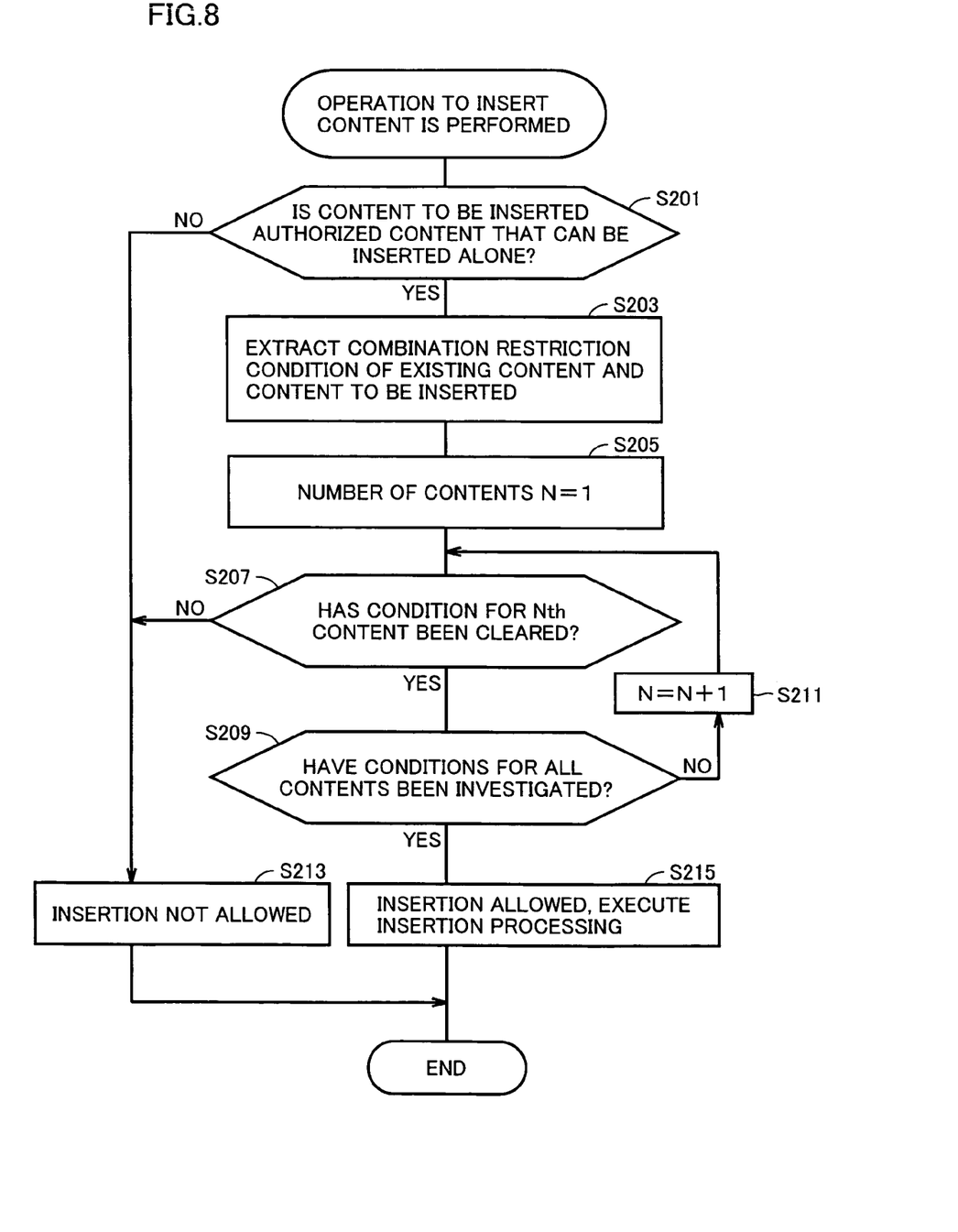
FIG. 8 is a flowchart showing a flow of control in insertion of the content in a second embodiment.

FIG. 8 is a flowchart showing a flow of control in insertion of the content in the second embodiment. A processing shown in the flowchart in FIG. 8 is also performed by reading and execution of a program stored in storage unit 103 by control unit 101 in portable phone 1.

Referring to FIG. 8, initially, as in the processing in the first embodiment, when the user selects the content to be inserted, for example, through selection from a library in order to create the animation content using portable phone 1, whether or not the content to be inserted is in a file format allowing insertion is checked (S201). If the content is not in the file format allowing insertion, or if information not allowing insertion with regard to the copyright has been added, or if the content is unauthorized (a manner of creating or obtaining the content is unauthorized) (No in S201), an operation for insertion is aborted (S213) and the program ends.

If insertion of the selected content is allowed (Yes in S201), successively, all combination restriction conditions are extracted (S203) by referring to the combination restriction information of the selected content and the already-inserted content.

Then, whether or not the extracted restriction condition is satisfied is investigated with regard to the selected content and the already-inserted content (S205 to S209).

If all conditions are satisfied (Yes in S207 and Yes in S209), insertion of the selected content is allowed and the processing for insertion is executed (S215).

Unless all conditions are satisfied (No in S207), insertion of the selected content is not allowed. Therefore, the operation for insertion is aborted (S213), for example, by showing a message such as "the content prohibiting combination has already been inserted" on display screen 11, and the program ends.

In this manner, the provider of the content sets the ID for the content and further adds the combination restriction information as the restriction information. Accordingly, not only management of the content alone but also management of the copyright or the like in using a plurality of contents can appropriately be performed. In other words, use in a specific combination alone can be allowed.

Execution of the processing described above by portable phone 1 in the present embodiment allows automatic and appropriate management of the copyright or the like of the content.

In addition, the ID of the content not allowing combination can be designated as the combination restriction information. Moreover, the number of contents that can simultaneously be used in combination can be restricted for each ID.

In the description above, the ID set for each content has been discussed as an ID represented in a simple tree structure. The ID, however, is not limited to such an example, and restriction using an attribute including the ID can be imposed by adding various keywords to the content as the attribute. Such restriction will be described in a third embodiment.

Third Embodiment

In the first and second embodiments described above, whether or not combination of the contents themselves is allowed or restriction on the combination function has been discussed. Here, combination restriction with regard to the attribute of the content will be discussed.

The content in the third embodiment is characterized by each having attribute information added as the restriction information. The ID specific to the content may be added in a manner included in the attribute information, as in the second embodiment.

Figure 9:
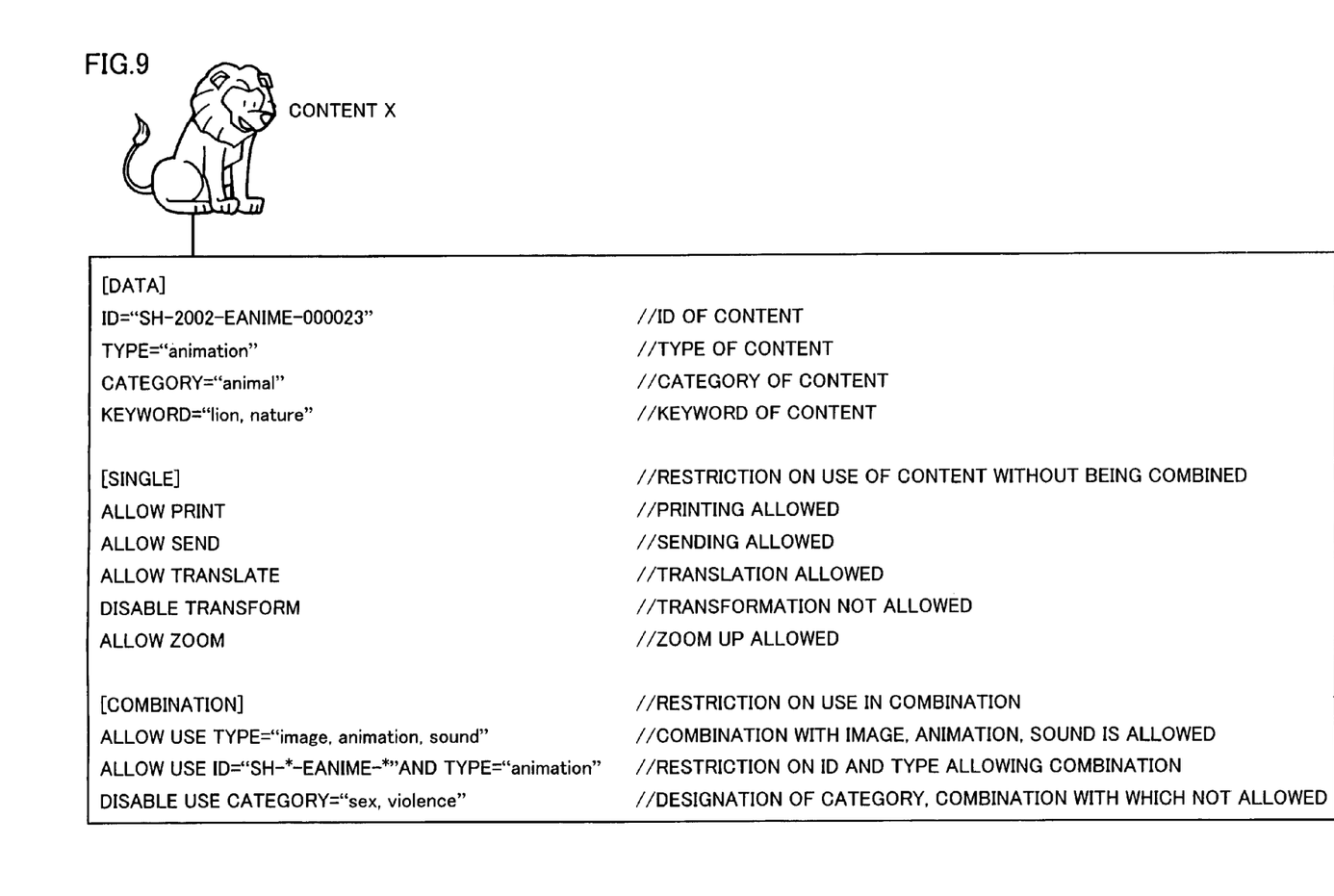
FIG. 9 illustrates a specific example of content provided with attribute information as the restriction information.

FIG. 9 illustrates a specific example of the content provided with the attribute information as the restriction information.

Referring to FIG. 9, content X is provided with specific information [DATA] indicating information of content X itself, restriction information [SINGLE] of content X alone, and restriction information [COMBINATION] restricting combination of content X with other content.

Examples of the specific information of the content include the ID that has previously been described, and a type, a category, and a keyword of the content. If such specific information is added to the content, it can be used for retrieval or categorization of the content. In addition, the specific information represents the attribute of the content without being combined, and restriction on the attribute, which will be described later, can be imposed based on such information.

The restriction information of the content without being combined is the information for restricting use of the content alone, and the information indicating whether or not printing, sending, translation, transformation, zoom-up, or the like is allowed. If such information is added to the content, restriction on the use as the content without being combined as described above can appropriately be imposed.

The restriction information restricting combination of the contents is the information restricting the use when the contents are combined, and the information indicating whether or not combination is allowed with regard to the attribute such as a data format, an ID, a type, and a category of other content. Examples of these attributes of the content include specific information of the content described above, information on the data format, and information included in the header or the like of the content. If such restriction information is added to the content, restriction on the use described above when the content is combined with other content can appropriately be imposed.

As to content X shown in FIG. 9, though printing or sending is allowed, transformation is not allowed. Meanwhile, though combination with an image, animation or music is allowed, the animation, combination with which is allowed, is restricted to animation having an ID of SH-*-EANIME-*. Here, combination with the image or the music is not restricted. In addition, regardless of the type of the content, combination with the content belonging to a sex category or a violence category is not allowed.

The attribute information added to the content is created by the provider of the content, as is the case with the content in the first and second embodiments.

In portable phone 1 in the third embodiment as well, restriction on combination is automatically controlled when the animation content is created by inserting the content described above. As the control in inserting the content in the third embodiment is similar to the processing shown in the flowchart in FIG. 8 in the second embodiment, description of redundant portions will not be repeated.

That is, in the third embodiment as well, the attribute information of the selected content and the already-inserted content is all extracted, and all conditions are investigated.

Only when all conditions are satisfied, insertion of the selected content is allowed and the processing for insertion is executed.

In this manner, the provider of the content adds the attribute information to the content as the restriction information. Accordingly, not only management of the content alone but also management of the copyright or the like in using a plurality of contents can appropriately and closely be performed. In other words, use in a specific combination of the contents in addition to use in combination with the content having a specific attribute can solely be allowed.

Execution of the processing described above by portable phone 1 in the present embodiment allows automatic and appropriate management of the copyright or the like of the content.

Here, the attribute information added to each content in the present embodiment is not limited to the examples described above. For example, if an item to be restricted is simple, the item to be restricted is defined in advance, and a dedicated flag is allocated to each item, so as to restrict combination with other content in accordance with the flag. In addition, a priority can be given to the restriction information on the attribute.

In addition, in the first to third embodiments above, it has been assumed that the restriction information added to each content is added to the content itself, for example, in the header of the content has been described. Meanwhile, the restriction information may be stored in server 3 managing the content.

In such a case, when the operation for inserting the content is performed, portable phone 1 can proceed the processing by obtaining the restriction information of the content from server 3. Alternatively, an authentication server not shown in FIG. 1 is provided so that the content is authenticated in advance by the authentication server and all authenticated contents may be used in combination with each other. Furthermore, by issuing a license for each provider, the contents provided by the licensed provider may all be used in combination with each other. In doing so, it is not necessary to obtain the restriction information of the content from server 3 every time the operation for inserting the content is performed.

Moreover, not only the restriction information on the content can be added to each content but also the restriction information on other content can be added thereto. More specifically, if content A is allowed to combine with prescribed content, the prescribed content may be provided with the restriction information (license) allowing combination with content A.

In the first to third embodiments described above, in the application of portable phone 1, the operation for insertion has been controlled by the processing described above in insertion of the selected content, based on the combination restriction condition added to each content. Meanwhile, the processing described above may be performed by checking whether or not the combination restriction condition is satisfied during the operation for insertion or at the time of storage, without limited to the time of insertion.

By adding the restriction information to the content as described above, not only combination of the contents but also a variety of operations or processings can be restricted. More specifically, restriction on zoom-up or down can also be imposed, such that zoom-up and down is allowed if a length-to-width ratio is maintained and otherwise not allowed, for example. In addition, restriction on rotation can be imposed, such that only a rotation up to a prescribed angle is allowed, for example. Moreover, restriction on reversal can also be imposed, such that up-down or left-right reversal is not allowed, for example. Further, restriction as to entire-image display can also be imposed, such that all portions should always be displayed without being hidden by other content (object), for example. In addition, restriction on color setting may also be imposed, such that color change is not allowed or such that color change only to red, blue and yellow in a prescribed area is allowed, for example. A time limit of use may also be set, depending on a time period of use, the number of times of use, or the like. If the content has a time as a parameter, that is, if the content is a moving picture, restriction on a reproduction processing such as replay, pause, fast-forward, rewind, and slow replay of the content may also be imposed.

The restriction described above merely shows specific examples of restriction on the clip art, and it may be other restriction in accordance with a format of the content. For example, if the content is an MIDI file (music content), restriction on a tone of sound or a speed of performance may be imposed. In addition, in the case of the content including a human 3D polygon model, restriction on a posture that can be designated or a position of a camera may be imposed.

As to restriction on combination, for example, restriction on use of the clip arts that can simultaneously be used may be imposed, such as prevention of simultaneous use of a plurality of clip arts of which copyright holders are different, or definition of combination that should always be used. In addition, restriction on a scale of simultaneously used clip arts may be imposed, such that the clip arts should be arranged in the same scale, for example. Accordingly, arrangement of a character in a random scale can be avoided. Moreover, restriction on positions of simultaneously used clip arts or a relative position thereof can be imposed, such that an emperor doll and an empress doll should be positioned on observer's left and right respectively, for example.

With such restriction, protection of the copyright of the content can be ensured. In addition, it can be ensured that the original concept of the content is prevented from being destroyed.

Not only restricting the operation for insertion for combination, a new processing can also be generated from combination. For example, if the contents provided by different providers are combined and simultaneously used, a usage fee for each content is incurred. Here, a processing for paying the usage fee to the provider of each content can automatically be performed. In addition, by combining the contents of prescribed providers, a charging system realizing prescribed discount, for example, can be developed.

Moreover, the content can be provided with a prescribed operation. For example, a setting may be such that, if content A and content B are combined, a character shown in content A smiles, while if content A and content C are combined, the character weeps.

In the description above, examples of the content include clip arts such as a photograph or an image, a moving picture, or music. The content, however, is not necessarily limited to such information or information in a file format. For example, a real time video image obtained from a camera attached to a terminal or a camera connected to a network is also included.

In addition, a method of restricting the operation or processing of the content described above may be provided as a program. Such a program can be recorded on a computer-readable recording medium such as a flexible disc, a CD-ROM, an ROM, an RAM, and a memory card adapted to a computer, and can be provided as a program product. Alternatively, the program may be recorded and provided in a recording medium such as a hard disk contained in the computer. Further, the program may be provided by downloading through the network.

The provided program product is installed in a program storage unit such as a hard disk for execution.

It is noted that the program product includes the program itself and the recording medium recording the program.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As described above, the present invention can advantageously be applied to management of the copyright or the like of the content, because combination with other content can be restricted.

The invention claimed is:

1. A method of restricting a content processing when second content is added to first content, comprising the steps of:
   recognizing first restriction information added to said first content;
   recognizing second restriction information added to said second content; and
   restricting a processing to combine said second content with said first content based on recognized said first and second restriction information; and storing the first content in a storage device; wherein
   at least one of said first content and said second content further includes information indicating an attribute of the content and including at least one of an ID, a keyword, a data format, a type, a category, and a genre specific to the content,
   when at least one of said first restriction information and said second restriction information includes a condition on said attribute of content to be combined in simultaneous, combined use with other content,
   in said step of restricting, all said included conditions on the attribute of said content to be combined are extracted from said first restriction information and said second restriction information, and unless said first content and said second content satisfy all said extracted conditions, a processing to add said second content to said first content is restricted, and
   when said second restriction information includes information restricting at least one of a processing for modification of scale size with respect to said second content, a rotation processing, a reversal processing, an entire-image display processing, a color change processing, a time limit of use, a processing for modification of a relative position, and a reproduction control processing in simultaneous, combined use with said first content,
   in said step of restricting, a processing in adding said second content to said first content is restricted based on said second restriction information.

2. The method of restricting a content processing according to claim 1, wherein
   said attribute of the content is represented by a hierarchical ID including at least one of information on a creator of said content, information on a copyright holder, information on a work, information on a time of creation, and specific information, and
   the condition on said attribute of said content to be combined is represented by an ID of content that can be combined with the content, including information of a prescribed hierarchy.

3. A content editing device performing content edition to add second content to first content, comprising:
   means for recognizing first restriction information added to said first content;
   means for recognizing second restriction information added to said second content; and
   means for restricting a processing to combine said second content with said first content based on recognized said first and second restriction information; wherein
   at least one of said first content and said second content further includes information indicating an attribute of the content and including at least one of an ID, a keyword, a data format, a type, a category, and a genre specific to the content,
   when at least one of said first restriction information and said second restriction information includes a condition on said attribute of content to be combined in simultaneous, combined use with other content,
   said means for restricting extracts all said included conditions on the attribute of said content to be combined from said first restriction information and said second restriction information, and unless said first content and said second content satisfy all said extracted conditions, said means for restricting restricts a processing to add said second content to said first content, and when said second restriction information includes information restricting at least one of a processing for modification of scale size with respect to said second content, a rotation processing, a reversal processing, an entire-image display processing, a color change processing, a time limit of use, a processing for modification of a relative position, and a reproduction control processing in simultaneous, combined use with said first content, said means for restricting restricts a processing in adding said second content to said first content based on said second restriction information.

4. The content editing device according to claim 3, wherein said attribute of the content is represented by a hierarchical ID including at least one of information on a creator of said content, information on a copyright holder, information on a work, information on a time of creation, and specific information, and the condition on said attribute of said content to be combined is represented by an ID of content that can be combined with the content, including information of a prescribed hierarchy.

5. A computer readable medium storing a program causing a computer to execute a method of restricting a content processing when second content is added to first content, the method comprising the steps of:

recognizing first restriction information added to said first content;

recognizing second restriction information added to said second content;

restricting a processing to combine said second content with said first content based on recognized said first and second restriction information; and storing the first content in a storage device; wherein at least one of said first content and said second content further includes information indicating an attribute of the content and including at least one of an ID, a keyword, a data format, a type, a category, and a genre specific to the content, when at least one of said first restriction information and said second restriction information includes a condition on said attribute of content to be combined in simultaneous, combined use with other content, in said step of restricting, all said included conditions on the attribute of said content to be combined are extracted from said first restriction information and said second restriction information, and unless said first content and said second content satisfy all said extracted conditions, a processing to add said second content to said first content is restricted, and when said second restriction information includes information restricting at least one of a processing for modification of scale size with respect to said second content, a rotation processing, a reversal processing, an entire-image display processing, a color change processing, a time limit of use, a processing for modification of a relative position, and a reproduction control processing in simultaneous, combined use with said first content, in said step of restricting, a processing in adding said second content to said first content is restricted based on said second restriction information.

6. A content editing device performing content edition to add second content to first content, comprising:

means for recognizing first restriction information added to said first content;

means for recognizing second restriction information added to said second content;

means for restricting a processing to combine said second content with said first content based on recognized said first and second restriction information, and means for storing the first content in a storage device; wherein at least one of said first content and said second content further includes information indicating an attribute of the content and including at least one of an ID, a keyword, a data format, a type, a category, and a genre specific to the content, when at least one of said first restriction information and said second restriction information includes a condition on said attribute of content to be combined in simultaneous combined use with other content, said means for restricting extracts all said included conditions on the attribute of said content to be combined from said first restriction information and said second restriction information, and unless said first content and said second content satisfy all said extracted conditions, said means for restricting restricts a processing to add said second content to said first content.

7. The content editing device according to claim 6, wherein said means for restricting restricts a processing in adding said second content to said first content based on said second restriction information, when said second restriction information includes information restricting at least one of a processing for modification of scale size with respect to said second content, a rotation processing, a reversal processing, an entire-image display processing, a color change processing, a time limit of use, a processing for modification of a relative position, and a reproduction control processing in simultaneous, combined use with said first content.

* * * * *